UNITED STATES PATENT OFFICE.

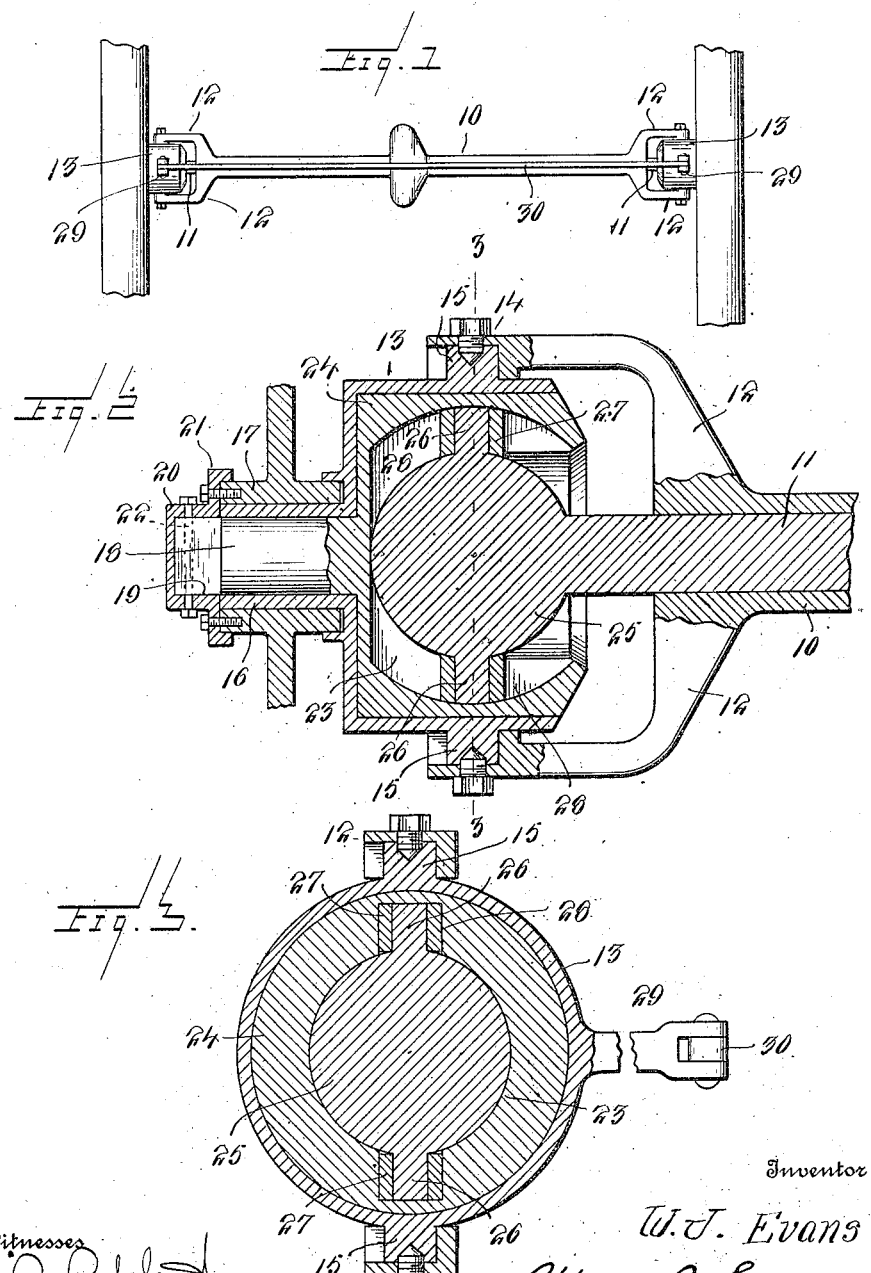

WILLIAM J. EVANS, OF LINNBURG, IOWA.

DRIVING MECHANISM FOR STEERING-WHEELS OF MOTOR-VEHICLES.

1,045,778.

Specification of Letters Patent.

Patented Nov. 26, 1912.

Application filed July 11, 1911. Serial No. 637,914.

*To all whom it may concern:*

Be it known that I, WILLIAM J. EVANS, a citizen of the United States, residing at Linnburg, in the county of Webster and State of Iowa, have invented new and useful Improvements in Driving Mechanism for Steering-Wheels of Motor-Vehicles, of which the following is a specification.

The invention relates to driving mechanism for motor vehicles, and more particularly to the class of steering mechanism for automobiles or the like.

The primary object of the invention is the provision of mechanism of this character in which the steering wheel of an automobile, motor vehicle, or the like may be turned in the ordinary well-known manner, and also that will enable the said wheel to be driven from the motor or other driving power of the machine, thereby permitting both the front and rear wheels to be driven.

Another object of the invention is the provision of mechanism of this character in which the steering wheel is supported in a novel manner, whereby the same may be turned for the guiding of the motor vehicle, as well as advancing the same.

A further object of the invention is the provision of a driving mechanism of this character in which the front steering wheel may be driven, irrespective of the angular disposition thereof, when guiding a motor vehicle or the like.

A still further object of the invention is the provision of mechanism of this character which is simple in construction, strong, durable, efficient and reliable in operation, and well adapted for the purpose for which it is designed.

With these and other objects in view, the invention consists in the construction, combination and arrangement of parts, as will be hereinafter more fully described, illustrated in the accompanying drawings, and pointed out in the claims hereunto appended.

In the drawings, Figure 1 is a front elevation of an axle and the steering wheels of an automobile, vehicle or the like, with the invention applied thereto. Fig. 2 is a fragmentary enlarged vertical sectional view through the same. Fig. 3 is a sectional view on the line 3—3 of Fig. 2.

Similar reference characters indicate corresponding parts throughout the several views of the drawings.

Referring to the drawings by numerals, 10 designates a tubular stationary front axle of an automobile, vehicle, or the like, and 11 the driving shaft, the same being journaled in the axle in any suitable manner. Formed on each end of the stationary axle 10 are laterally extending arms 12, between which is arranged a steering knuckle 13 having extensions 14 which are provided with pivot lugs 15 engaging in suitable openings formed in the arms 12, thereby pivotally connecting the knuckle to the said arms. The steering knuckle 13 further has a supporting sleeve 16, on which the hub 17 of the wheel rests, which is of the ordinary well-known construction. The supporting sleeve 16 of the steering knuckle is arranged in the central opening or bore in the said hub 17 of the wheel.

Extending through the central opening in the sleeve 16 is a rotatable spindle 18, the outer end of which is formed with a squared portion 19 which engages in a correspondingly squared socket formed in a removable cap 20, the latter being provided with an annular flange 21 which is bolted or otherwise secured to the outer end of the hub 17, so that upon rotation of the spindle 18, the said hub will rotate therewith. To more securely fasten the cap 20 to the spindle 18, there is passed through the said cap a transverse bolt member 22, the same being also passed through the outer squared portion 19 of the spindle, so that the said hub will rotate upon the supporting sleeve 16, when the spindle is driven, in a manner presently described.

Formed on the inner end of the spindle 18 is a cylindrical-shaped boxing 24 rotatably mounted within the knuckle 13, the boxing being formed with a substantially spherical-shaped ball socket 23, in which is loosely engaged a ball terminal 25 formed on the end of the driving shaft 11, adjacent to the said spindle 18, the ball terminal being formed with diametrically opposed outwardly extending lugs or pins 26, on which are rotatably engaged slide blocks 27, the latter being movably engaged in grooves or raceways 28 formed in the inner wall of the socket 23, so that the knuckle 13 may be turned at various angles, without interfering with the driving connection between the socket 23 and the ball terminal 25 on the driving shaft. It will be seen that the slide blocks 27 will move in the groove or raceway 28 in the said socket 23, when the knuckle 13 is angularly shifted, and that the said driving shaft 11 will be positively connected with the spindle 18 for the rotation thereof.

Integral with and projecting from the knuckle 13 are arms 29, to which are pivotally connected union rods 30 of the ordinary well-known construction, and one of these arms 29 is suitably connected with the steering wheel shaft (not shown,) so that the front wheels may be shifted for the guiding of the motor vehicle, as usual.

It is of course understood that the driving shaft 11 is actuated in any ordinary well-known manner, that is to say, from an engine (not shown) supported in the body of the vehicle.

From the foregoing, taken in connection with the accompanying drawings, it is thought that the construction and operation of the invention will be readily understood, without requiring a more extended explanation.

What is claimed is:—

The combination with a stationary axle having a forked end, of a driving shaft journaled in said axle and having a ball terminal, a hollow knuckle detachably pivoted in said fork for swinging movement and having an outwardly projecting sleeve, adjustable means engaged in the fork and the said knuckle for detachably engaging the same, a wheel hub rotatably supported upon said sleeve, a spindle rotatable in the sleeve and having connection with said hub, a cylindrical boxing formed on the spindle and rotatably mounted within the said knuckle, the said boxing being provided with a spherical-shaped socket receiving the said ball terminal, the said boxing being further provided with diametrically opposed slots opening into the socket, and lugs formed on the ball terminal at diametrically opposite points and engaged in said slots.

In testimony whereof I affix my signature in presence of two witnesses.

WILLIAM J. EVANS.

Witnesses:
P. A. SWANSON,
GEO. H. HARMON.